Oct. 27, 1964 MASAMI TOMONO ET AL 3,154,445

METHOD OF PRODUCING PN JUNCTIONS

Filed Nov. 30, 1960

United States Patent Office 3,154,445

Patented Oct. 27, 1964

3,154,445

METHOD OF PRODUCING PN JUNCTIONS

Masami Tomono, Takeshi Takagi, Takashi Tokuyama, and Eisaburo Yamada, all of Tokyo-to, Japan, assignors to Kabushiki Kaisha Hitachi Seisakusho, Tokyo-to, Japan, a joint-stock company of Japan Filed Nov. 30, 1960, Ser. No. 72,746
Claims priority, application Japan Dec. 21, 1959
1 Claim. (Cl. 148—179)

This invention relates to the production of semiconductor devices, and more particularly it relates to a new and improved method of producing pn junctions.

Heretofore, the conventional method of producing npn junctions or pnp junctions has ordinarily comprised, for example, as indicated in FIG. 1 of the accompanying illustrations, alloying small pieces 3 and 4 of alloy with n-type impurity on each of the opposing parts on the two surfaces of a thin semiconductor wafer 1 of p-type, causing n-type recrystallized layers 4 and 5 to be formed, and obtaining, thereby, an npn junction. By this conventional method, however, it is extremely difficult to control so as to make the surfaces of the two n-type layers 4 and 5 parallel and, moreover, to make the thickness W of p-type, substrate, semiconductor layer therebetween be 10 microns or less. This difficulty has been widely known.

Furthermore, in such cases as the above, the recrystallized layers 4 and 5 inevitably become n-type layers containing a large quantity of impurities, and it is almost impossible to make either of the said layers 4 and 5 become an n-type layer of high resistance. Yet, there are cases wherein, with respect to certain kinds of purposes, it is required that either of the said n-type layers 4 and 5 be caused to have high resistance.

It is, therefore, an essential object of the present invention to provide a new method of producing pn junctions, by the practice of which it is possible to eliminate in an easy manner the various above-mentioned difficulties associated with the conventional method of producing alloy-type, pn junctions.

It is another object of the invention to provide a method of producing pn junctions as stated above whereby extremely thin pn junctions of controllable and uniform characteristics are producible.

Said objects and other objects and advantages of this invention as will become apparent presently have been achieved by the method of the present invention, the principle of which, in general, utilizes the variation of the transitional effective coefficient of segregation $k_{eff}$ during the growth of the semiconductor single crystal from the molten semiconductor containing n-type and p-type impurities.

The method of the present invention comprises alloying onto a substrate semiconductor having a certain conductivity type an alloy containing such one or more than one kind of active impurity as to impart one conductivity type which is considerably varied in accordance with variation of the crystal growth speed of the aforesaid semiconductor, and such one or more than one kind of active impurity having a coefficient of segregation the variation of which is relatively low as to impart a conductivity type differing from that imparted by the first-mentioned impurity; and utilizing the variation with the time of the coefficient of segregation of said one or more than one kind of active impurity, of the aforesaid two conductivity types occurring in the recrystallization process of the said semiconductor during the alloying process.

The details of the invention, including the details of the above-mentioned principle, and the manner in which the aforementioned objects and advantages may best be achieved will be understood more fully from a consideration of the following description, taken in conjunction with the accompanying drawing, in which the same or equivalent parts and quantities are designated by the same reference numbers and letters, and in which.

Figure 1:
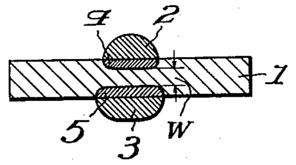
FIG. 1 is a sectional view showing a model of an npn or a pnp junction produced by a conventional method.
Figure 2:
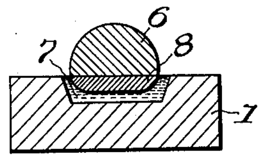
FIG. 2 is a sectional view showing a model of a pn junction produced by the method of the present invention.

In the junction model shown in FIG. 2, if, by way of example, a small piece 6 of alloy with active impurities of low melting point, which contains both an n-type impurity (for example: antimony) and a p-type impurity (for example: indium) is placed on a thin wafer 1 of semiconductor (for example: n-type germanium) and in a condition wherein a suitable temperature lower than the melting point of the semiconductor wafer 1 is maintained, only the alloy with active impurities is melted, one portion of the thin substrate semiconductor wafer 1 will dissolve into the molten alloy with impurities. Then, if the temperature is lowered, a p-type recrystallized layer 7 and an n-type recrystallized layer 8, which contain a relatively greater quantity of impurities than the substrate semiconductor wafer 1, will be formed on the sub-strate surface of the interface between the said semiconductor wafer 1 and the molten alloy with impurities. In general, during the regrowth of the semiconductor crystals from the molten phase in this case, as is made clear in such references as the disclosure by D. Turnbull in the Journal of Applied Physics (vol. 21, 1950, p. 804), supercooling occurs easily, and, when a certain rate of supercooling is reached, the crystal growth occurs at a rapid rate. Accordingly, it may be considered that the formation of a recrystallized layer in this case occurs at a substantially faster rate than the average cooling rate. According to the results of experiments by the present inventors, a recrystallization growth rate of 1 to 2 millimeters per minute for germanium from the molten liquid of an impurity alloy the principal constituent of which is indium was obtained with respect to a germanium substrate, by way of example, but this is 100 to 1,000 times the value at average cooling rate.

Figure 3:
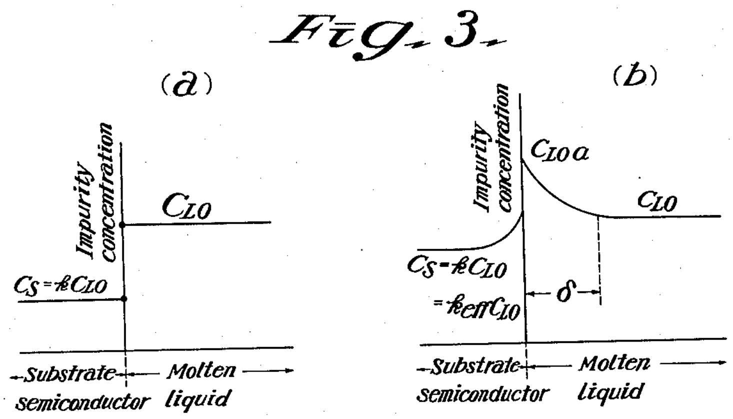
FIG. 3 shows graphical representations for an explanation of variation of the impurity concentration during the initial period and during the final period of the growth of a recrystallized layer.

If this solid, substrate semiconductor and the molten alloy phase which is in a state of equilibrium are considered, and if it is assumed that the quantity of n-type (or p-type) impurity in this alloy is relatively less than that of the other constituents of the alloy, the distributions, immediately prior to the beginning of recrystallization, of said n-type (or p-type) impurity in the semiconductor and molten alloy will be as shown in FIG. 3(*a*). In this graph, $C_s$ designates the impurity concentration contained within the recrystallized layer, and $C_{LO}$ designates the impurity concentration within the molten phase which is in contact with the said recrystallized layer. Then, when the temperature is lowered, and the recrystallization of the semiconductor begins, the relation between the impurity concentration $C_s$ within the recrystallized layer and the impurity concentration $C_{LO}$ within the molten alloy phase which is in contact with the recrystallized layer may be expressed by $$\frac{C_s}{C_{LO}}=k$$

The quantity $k$ is called the coefficient of segregation. When $k \ll 1$, the semiconductor is recrystallized from the molten alloy phase onto the surface of the substrate semiconductor, and recrystallization progresses, whereby and in accordance therewith, the aforesaid impurity is left remaining in the molten alloy phase contacting the interface. Accordingly, with the progress of recrystallization, the impurity concentration within the molten alloy layer in the vicinity of the interface gradually increases. Since the impurity in this region diffuses away from the interface, the impurity at the time of completion of recrystallization will be distributed as represented in FIG. 3(*b*). That is, the impurity concentration of the interface will be increased to become $C_{LOa}$, and in accordance therewith, the impurity concentration within the substrate semiconductor will be $kC_{LOa}$. Moreover, if the impurity diffusion coefficient within the molten phase is designated by D, and the time required for recrystallization is designated by $t$, the distance $\delta$ within which the variation of impurity concentration is principally occurring within the molten phase may be represented as an approximation by the following equation.

$$\delta \approx \sqrt{Dt} \qquad (1)$$

Accordingly, in this case, the apparent coefficient of segregation of the case of FIG. 3(*b*) is as follows:

$$K_{eff} = k \frac{C_{LOa}}{C_{LO}} \qquad (2)$$

where $$\frac{C'_{LOa}}{C_{LO}} > 1$$

Figure 4:
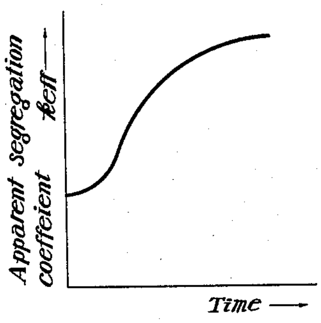
FIG. 4 is a graphical representation for describing the variation of effective coefficient of segregation with time.

On one hand, the variation with time of the apparent coefficient of segregation $k_{eff}$ for the case wherein recrystallization occurs at a constant rate is represented graphically in FIG. 4.

By using an alloy containing n-type and p-type impurities, and utilizing the above-described phenomenon, it is possible to produce a pnp or an npn junction. The principle will be explained in the following descripiton with germanium taken as an example.

In the case wherein a single crystal of germanium is grown from a molten germanium liquid containing a p-type impurity such as indium or gallium, the variation of $k_{eff}$ due to its rate of growth is relatively small, and in the case wherein an n-type impurity such as antimony or arsenic is contained, the variation of $k_{eff}$ due to the rate of growth of a single crystal is considerably greater than that of the above, first-stated case. This fact is known generally in the art. For example, according to the disclosure by J. A. Burton and others in the Journal of Chemical Physics (vol. 21, 1953, p. 1987), regarding the variation of the apparent coefficient of segregation $k_{eff}$ of antimony and gallium, due to the rate of crystal growth during the growth of a single crystal of germanium, it is stated that, since antimony has a lower diffusion coefficient within the molten phase than gallium (diffusion coefficient of antimony, $D_{Sb} \doteqdot 5.5 \times 10^{-5}$ cm.$^2$/sec.; diffusion coefficient of gallium, $D_{Ga} \doteqdot 7.5 \times 10^{-5}$ cm.$^2$/sec.), if the rate of recrystallization of germanium is relatively large, the antimony will be readily segregated in the molten liquid of impurity alloy near the recrystallization surface, as a consequence of which the degree of variation, due to the rate of growth, of the apparent coefficient of segregation in the case of antimony will be substantially greater. For example, in the cases wherein the growth speeds of single crystal are 0.4 mm./min. and 2 mm./min., the values of $k_{eff}$ for antimony and gallium are, respectively, 0.003 and 0.006 for the first case, which is a twofold increase, whereas, in the second case, the said values are, respectively, 0.11 and 0.12, which represent hardly any variation.

If the above-described phenomenon is utilized, and a small piece of impurity alloy containing n-type impurity antimony and p-type impurity indium is placed on a thin n-type germanium wafer, for example, and, by heating to a suitable temperature by a known method, the impurity alloy only is melted, the germanium in the portion in contact with this alloy will melt and be dissolved in the molten liquid. If, after a certain time, cooling is carried out at a relatively slow rate, the molten liquid will undergo supercooling, and when this supercooling reaches a limit, the recrystallized layer of germanium is formed with a growth rate which is substantially greater than the cooling rate.

Figure 5:
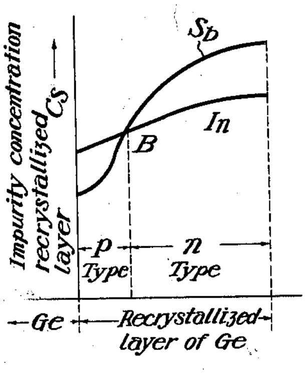
FIG. 5 is a graphical representation showing the conditions of impurity concentration in a recrystallized layer developed by the practice of this invention.

During the above process, since, as described above, the degrees of variation with time of the apparent coefficient of segregation in the cases of antimony and indium differ considerably, if the relative, compositional quantities of the two impurities are suitably selected in the impurity alloy, a large quantity of indium will be contained in the recrystallized layer during the initial stage of recrystallization as indicated in FIG. 5, and the said layer will become that of p-type. However, as the recrystallization progresses, the quantity of antimony in the solid phase is gradually increased by variation of $k_{eff}$ until it passes the point B in FIG. 5, whereupon the antimony content becomes greater than that of the indium, and the recrystallized layer reverts to one of n-type. In this manner, by alloying only a single, small piece of impurity alloy with n-type germanium, it is possible to obtain an npn junction as indicated in FIG. 2. Furthermore, by varying the proportions of n-type and p-type impurities, it is possible to adjust at will the thickness of the p-type recrystallized layer 7. Accordingly, the formation of a p-type recrystallized layer which is extremely thin is also possible.

Moreover, as is clear from FIG. 5, since the p-type or n-type recrystallized layer is formed by the alloying method, the impurity concentration in it is extremely high. For this reason an npn junction having unique properties is formed. (For example: the concentration of impurities in the recrystallized layer is $C_s \geqq 10^{17}$/cm.$^3$.)

From the results obtained by the method of the present invention, it has been found that if, for example, an n-type germanium wafer of specific resistance of 5 to 50 ohm-cm. is used as the substrate semiconductor, and a small piece of alloy composed of 90% (by weight) of lead, 9% (by weight) of indium, and 1% (by weight) of antimony is alloyed for 5 minutes at 750° C., onto the said substrate semiconductor in a manner embodying the present invention, a section of the pn junction formed, when represented as a model, will appear as that shown in FIG. 2. In this case, the thickness of the entire recrystallized layer formed is approximately 20 microns, and of this the thickness of the p-type recrystallized layer is of the order of 10 microns and contains about $10^{17}$ cm.$^{-3}$ p-type impurities. While, the net concentration of active impurity in n type layer is about $10^{16}$ cm.$^{-3}$.

It has also been found possible to produce an npn junction having a p-type recrystallized layer of a thickness of the order of approximately 3 microns by using a weight ratio of indium to antimony in the impurity alloy dot of 6.5:3.5. Moreover, it was found that, in general, the larger the ratio of antimony to indium is, the thinner is the p-type recrystallized layer which can be produced.

Furthermore, it has been found that, by varying the ratio of antimony to indium, it is possible to vary over a wide range the specific resistances of the p-type layer 7 and the n-type layer 8 shown in FIG. 2 simultaneously and each independently of the other. This feature is extremely important relative to certain purposes.

The foregoing description has dealt principally with the case wherein an n-type germanium is used for the substrate semiconductor, and antimony and indium are used as active impurities. However, by using an intrinsic type (i-type) or weak p-type ($p^-$-type) germanium for the substrate germanium, it is possible to produce, respectively, an ipn junction or $p^-$pn junction. Furthermore, the same results are obtainable also with combinations of semiconductors other than germanium and suitable impurities.

It is moreover possible to use mixtures of so-called carrier metals which do not greatly impair the characteristics of semiconductors as the impurity alloy in addition to the p-type and n-type impurities described above.

It is not necessary to limit each of the n-type and p-type impurities to one kind; it is also possible to use one or more kinds of each impurity as mixtures, depending on the necessity.

As set forth in the foregoing description, the practice of the present invention has a significant effectiveness in enabling the forming of two recrystallized layers of extremely thin dimensions and of different conductivity types on a semiconductor substrate.

Although this invention has been described with respect to a particular embodiment and a few suggested modifications thereof, it is not to be so limited as further changes and modifications may be made therein which are within the full intended scope of the invention, as defined by the appended claim.

We claim:

The method for producing an n-p-n junction semiconductor device which comprises placing a quantity of an alloy consisting of 90% by weight of lead, 9% by weight of p-type impurity indium, and 1% by weight of N-type impurity antimony, onto an N-type germanium semiconductor substrate, heating said alloy and said semiconductor substrate for 5 minutes at 750° C. to melt said alloy and to dissolve a portion of said semiconductor substrate in said melted alloy, cooling said melted alloy and said melted semiconductor material so as to recrystallize a layer rich in said P-type impurity immediately adjacent to said semiconductor substrate, and to recrystallize a layer rich in said N-type impurity immediately adjacent to said recrystallized layer rich in P-type impurity.

References Cited in the file of this patent

UNITED STATES PATENTS

| | | |
|---|---|---|
| 2,840,497 | Longini | June 24, 1958 |
| 2,938,819 | Genser | May 31, 1960 |
| 3,001,894 | Becker et al. | Sept. 26, 1961 |
| 3,010,857 | Nelson | Nov. 28, 1961 |

FOREIGN PATENTS

| | | |
|---|---|---|
| 801,713 | Great Britain | Sept. 17, 1958 |